(12) United States Patent
Biver et al.

(10) Patent No.: US 8,153,193 B2
(45) Date of Patent: Apr. 10, 2012

(54) METHOD FOR PRODUCING AN ARTICLE MADE OF A TRANSPARENT MATERIAL DEVOID OF VISIBLE SURFACE LINES AND THE THUS OBTAINED ARTICLE

(75) Inventors: Claudine Biver, Nanterre (FR); Noémie Lesartre, Paris (FR); Jean-Marc Padiou, Champigny sur Marne (FR); Robert Valeri, Tampa, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 997 days.

(21) Appl. No.: 11/993,796

(22) PCT Filed: Jun. 22, 2006

(86) PCT No.: PCT/FR2006/050619
§ 371 (c)(1),
(2), (4) Date: Dec. 21, 2007

(87) PCT Pub. No.: WO2006/136757
PCT Pub. Date: Dec. 28, 2006

(65) Prior Publication Data
US 2010/0136290 A1    Jun. 3, 2010

(30) Foreign Application Priority Data
Jun. 22, 2005    (FR) ...................................... 05 06350

(51) Int. Cl.
*B05D 5/06*    (2006.01)
(52) U.S. Cl. ........................................................ 427/164
(58) Field of Classification Search .................. None
See application file for complete search history.

(56) References Cited

U.S. PATENT DOCUMENTS

| | | | |
|---|---|---|---|
| 4,049,861 A | 9/1977 | Nozari | 428/220 |
| 4,319,945 A | 3/1982 | Howden | 156/212 |

(Continued)

FOREIGN PATENT DOCUMENTS

EP    0556646    8/1993

(Continued)

OTHER PUBLICATIONS http://www.attension.com/?id=1092&cid=, accessed Jan. 14, 2011, printout attached.*

*Primary Examiner* — Michael Cleveland
*Assistant Examiner* — Michael G Miller
(74) *Attorney, Agent, or Firm* — Fulbright & Jaworski L.L.P.

(57) ABSTRACT

A method for producing an article which is made of a transparent material and devoid of visible surfacing lines, comprising:
  obtaining a substrate which is made of a transparent material having a refractive index ns, at least one main face of which has been ground and polished in such a way that the Ra value thereof ranges from 0.001 to 0.1 μm, but has visible surface defects in the form of thin individual scratches;
  depositing, a liquid polymerisable composition of a masking coating, the contact angle of which with said substrate main face being equal to or less than 30° and which forms upon polymerization a masking coating having a refractive index nc such that $0.01<|n_s-n_c|\leq0.15$ and a thickness less than 10 micrometers, directly onto the ground and polished main face of the substrate,
  polymerizing the masking coating composition; and
  recovering the transparent article.

67 Claims, 2 Drawing Sheets

U.S. PATENT DOCUMENTS

Figure 1:
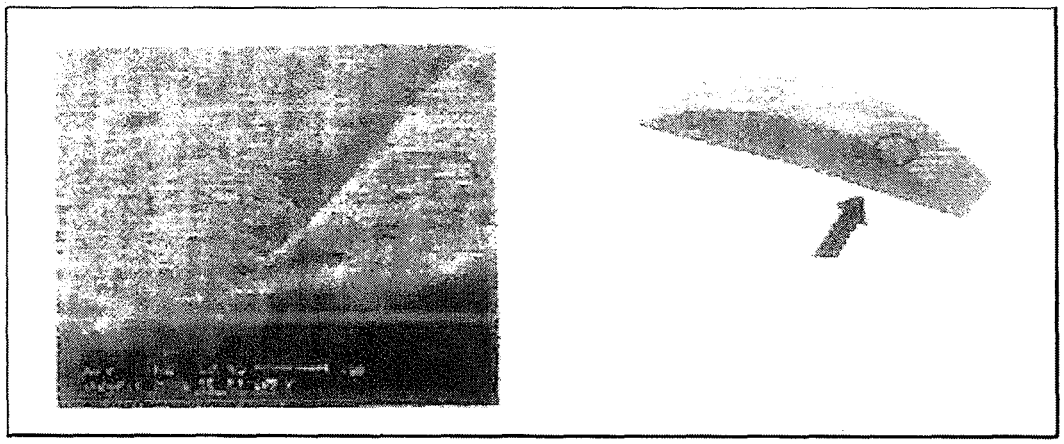

| | | | |
|---|---|---|---|
| 4,332,861 A | 6/1982 | Franz et al. | 428/520 |
| 4,417,790 A | 11/1983 | Dawson et al. | 351/166 |
| 5,638,479 A | 6/1997 | Takami et al. | 385/124 |
| 5,744,568 A * | 4/1998 | Kosaka et al. | 528/58 |
| 6,268,055 B1 | 7/2001 | Walters et al. | 428/413 |
| 2003/0022956 A1* | 1/2003 | Wanigatunga et al. | 522/25 |
| 2004/0074261 A1* | 4/2004 | Caron et al. | 65/396 |
| 2004/0156110 A1* | 8/2004 | Ikeyama | 359/603 |

FOREIGN PATENT DOCUMENTS

| | | |
|---|---|---|
| WO | WO 01/67139 | 9/2001 |
| WO | WO 03/056366 | 7/2003 |
| WO | WO 2004/101260 | 11/2004 |
| WO | WO 2005/063473 | 7/2005 |
| WO | WO 2005/063473 A1 * | 7/2005 |

* cited by examiner

METHOD FOR PRODUCING AN ARTICLE MADE OF A TRANSPARENT MATERIAL DEVOID OF VISIBLE SURFACE LINES AND THE THUS OBTAINED ARTICLE

This application is a national phase application under 35 U.S.C. §371 of International Application No. PCT/FR2006/050619 filed 22 Jun. 2006, which claims priority to French Application No. 0506350 filed 22 Jun. 2005. The entire text of each of the above-referenced disclosures is specifically incorporated herein by reference without disclaimer.

The invention relates in general to a process for producing a transparent article, devoid of visible optical defects after surfacing operations, and its application to the production of optical articles such as lenses, particularly ophthalmic lenses and preferably eyewear lenses.

Conventionally, the main faces of a substrate made of transparent material for producing an optical article are subjected to surfacing.

The surfacing of the substrate comprises all the operations leading to the creation of an optical article such as an eyewear lens the surfaces of which are perfectly polished and possess the desired curvatures (powers).

Typically, the surfacing comprises three successive steps, namely grinding, fining and polishing.

Grinding is a stage of mechanical processing the purpose of which, with the help of a coarse grain diamond tool or a milling cutter, is to apply a curvature to one face of the substrate. Fining is also a stage of mechanical processing that is carried out after grinding, using an abrasive tool with a fine grain (diamond, emery, carborundum . . . ). The surface of the substrate after fining in this way has a satin-like appearance.

The last operation of surfacing that leads to a perfectly polished and transparent surface is called polishing and again consists in a stage of mechanical processing using felt discs in contact with a suspension of a very fine abrasive (alumina, diamond . . . ).

Grinding which, as indicated above, has as its main objective to confer to at least one main face of the substrate, a desired curvature, is a short stage which results in an opaque or opalescent substrate the ground face of which has ripples, which are defects with a large amplitude and a low frequency, generally in the form of a spiral, over which is a superimposed roughness composed of defects of low amplitude and high frequency.

The fining further modifies the geometry of the processed face of the substrate but the essential objective of this is to remove the ripples as far as possible and reduce the roughness.

This stage of the mechanical processing leads to a translucent (but not yet transparent) article the fined face of which is still very rough.

Lastly, polishing, a relatively long mechanical processing stage, which does not alter the treated face of the substrate, eliminates the remaining roughness as far as possible in order finally to obtain a transparent optical article.

These surfacing techniques have recently been improved.

In particular, CNC (Computer Numerical Control) machines, such as for example those produced by Schneider, make it possible to eliminate a substantial proportion of the defects of the ripple type during the grinding stage and to obtain a quality of surface such that the fining stage can be omitted and the polishing stage can be undertaken immediately.

However, these techniques do not make it possible to obtain substrates that are totally free from optical defects, in particular thin scratches persist that are related to this operation of polishing on the surface of the substrate.

In general, state of the art techniques have already been described that aim to cover the rough surface of a substrate or optical lens that has been previously ground and optionally fined with a coating, in order to improve its optical surface and thus remove one and/or the other of the stages of fining or polishing.

Thus, the U.S. Pat. No. 4,417,790 proposes a finishing method in which the lens which has simply been ground is varnished so as to obtain an optical quality surface and reduce the time needed to finish the lens.

According to this patent, a coating with a thickness of approximately $10R_a$ is deposited on the surface, where $R_a$ is the mean arithmetic roughness of the machined surface.

This method does not give entire satisfaction from the cosmetic point of view and does not make it possible to eliminate all the surface defects, some of which remain visible under an arc lamp.

Patent WO-0167139 proposes a finishing method of an ophthalmic lens surface according to a given specification, according to which a coating of varnish with a thickness comprised between approximately $30\ R_a$ and $800\ R_a$ is applied to the surface, where $R_a$ is the mean arithmetic roughness of said surface, in order to confer a polished surface state to it.

The layer of varnish advantageously presents a refractive index substantially equal to that of the lens with a tolerance of 0.01.

The patent indicates that the layer of varnish deposited on the surface of the lens and the lens form a single diopter, this lens then meeting requirements from a cosmetic point of view since it does not have on the one hand any visible iridescence at the substrate-varnish interface and on the other hand any observable defects in transmission, with an arc lamp.

The layer of varnish is deposited directly on the machined surface, the stages of fining and polishing then being omitted, or else after the fining stage.

However, this technique does not yet give total satisfaction as regards removing the optical defects caused by the surfacing scratches.

Moreover, it has at least two disadvantages.

Firstly, the thicknesses recommended for the coatings are large, and it is always difficult to control such deposits.

Then, as indicated above, the technique described in the patent WO-01167139 requires the use of a varnish with a refractive index that is practically identical to that of the substrate.

A first object of the present invention is thus to supply a new rapid method that makes it possible to obtain a transparent article, notably a lens, with a very high optical quality, particularly devoid of visible surfacing lines.

A second object of the present invention is to supply a method using a masking coating for surfacing scratches, the refractive index of which can be significantly different from that of the substrate, such that it is not necessary to adapt the refractive index of the masking coating to the substrate of the lens.

A third object of the invention is to supply a new method using a masking coating that makes it possible to obtain a transparent article, notably an ophthalmic lens, devoid of visible surfacing scratches and visible interference fringes, while possessing all the required properties for optical articles and particularly for a lens, that is a low yellow index, a high resistance to shocks and abrasion, good adhesion of functional deposited coatings and good durability of properties over time.

The above aims are reached according to the invention by a method for obtaining a transparent article devoid of visible surfacing scratches comprising:

obtaining a substrate which is made of a transparent material having a refractive index $n_s$, at least one main face of which has been ground and polished to a value of $R_a$ varying from 0.001 to 0.01 μm but which has visible surface defects in the form of thin individual scratches with a cross section, preferably wedge shaped;

depositing directly on the main ground and polished face of the substrate a liquid polymerisable composition of a masking coating having a contact angle with the main surface of the substrate equal to or less than 30°, and forming by polymerisation a masking coating having a refractive index $n_c$ such that $0.01<|n_s-n_c|\leq 0.15$, preferably $0.05\leq|n_s-n_c|\leq 0.15$, and a thickness of less than 10 μm;

polymerising the composition of masking coating; and recovering the transparent article, the substrate ground and polished main face of which is directly coated by the masking coating, and which is devoid of visible fine surfacing scratches.

The method of measuring the visible surface defects (lines, superficial scratches) observable in transmission will be described in detail herein after.

In the present description and claims, unless otherwise indicated, the refractive indices are determined at a temperature of 25° C. at a wavelength of 550 nanometers.

In specified cases, $n_e$ (mercury 546.1 nm) and $n_D$ (sodium 589.3 nm) (at 25° C.) are measured.

This invention also relates to an article, notably an optical article, more particularly an ophthalmic lens and preferably an eyewear lens, comprising a substrate made of a transparent material having a refractive index $n_s$, at least one main face of which has a value $R_a$ varying from 0.001 to 0.01 μm and has surface defects in the form of thin individual scratches, preferably of wedge-shaped cross section, and a transparent masking coating having a refractive index $n_C$, with a thickness less than 10 μm directly covering said main surface of the substrate, the refractive indices $n_s$ and $n_c$ satisfying the relation $0.01<|n_s-n_c|\leq 0.15$.

This invention also relates to a transparent article devoid of visible surfacing scratches liable to be obtained by the above method.

Figure 2:
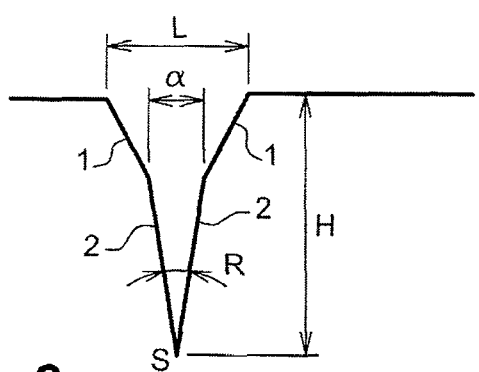

The rest of the description refers to attached figures which represent, respectively:

FIG. 1: a scanning electron microscope microphotograph showing the morphology of a thin individual scratch on a face of a substrate; and FIG. 2: a diagrammatic representation of the cross section of an thin individual scratch.

Figure 3:
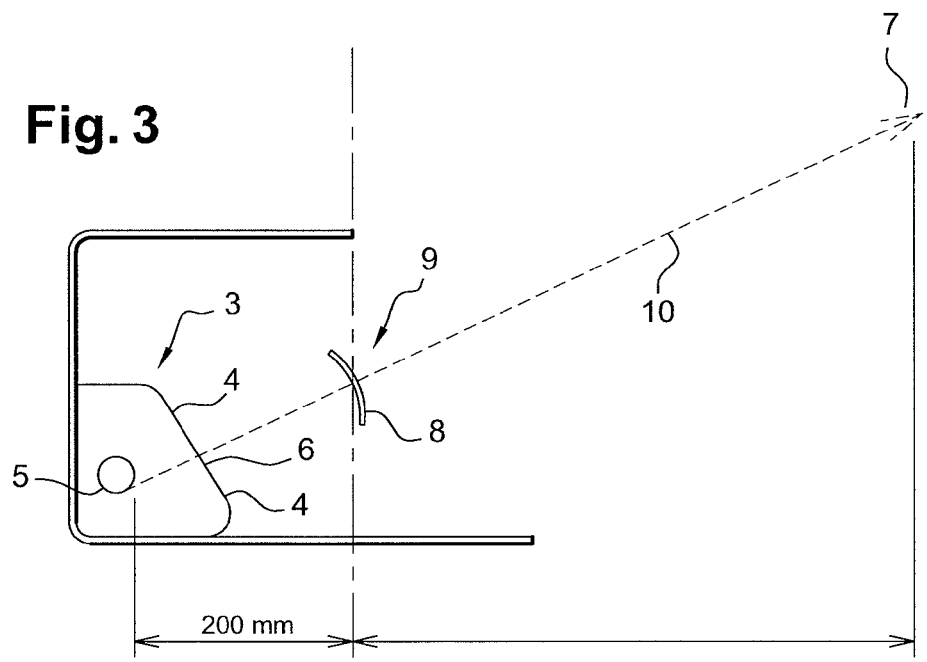

FIG. 3: a cross section of the device for visual measurement of the surface defects of an ophthalmic lens, and the schematic diagram of the measurement.

Figure 4:
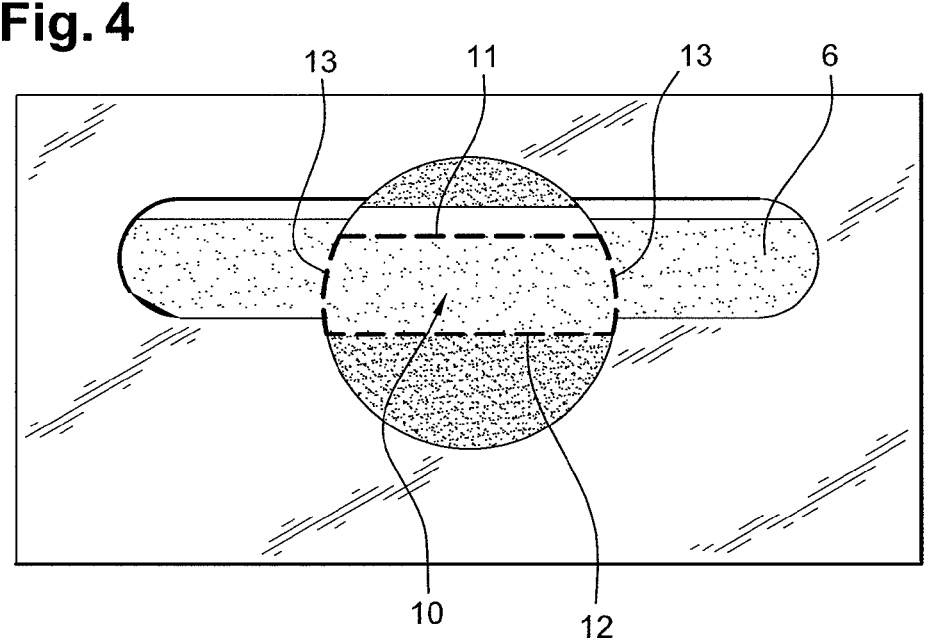

FIG. 4: the inspection area of an ophthalmic lens, when the ophthalmic lens is correctly placed in the visual measuring device to ensure that it is observed by the wearer.

The substrates made of transparent material used in the method of the invention are substrates of which at least one main face has been subjected to surfacing, and more particularly substrates of which at least one main face has been subjected solely to a grinding and a polishing, as is particularly the case when CNC type machines are used.

After the surfacing, the main face obtained after polishing has a mean arithmetic roughness $R_a$ ranging from 0.001 to 0.01 μm, but has visible surface defects, notably under an arc lamp, in the form of thin individual scratches, generally with a wedge shaped cross section as shown in FIG. 1.

The mean arithmetic roughness $R_a$ of the polished surface is measured over a rectangular area of 0.6 mm×0.8 mm using an interferometric microscope.

The term thin individual scratches, as used herein is understood to mean lines appearing on the main surface of the substrate, of variable length, but clearly distinct from each other.

These lines can have a cross section the general shape of which is given in diagram form in FIG. 2.

The fine scratch represented in FIG. 2, with a wedge shape with a cross section of a general triangular shape, is open at the level of the main face of the substrate and has two convergent side walls that that extend into the substrate to a sharp edge shown as the apex S in FIG. 2

The width L of the opening of this thin scratch on the main face of the substrate varies for example from 0.5 to 4 μm and these thin scratches have a depth H, from the main face of the substrate to the apex S, varying for example from 0.5 to 2 μm.

As we see in FIG. 1 and as shown diagrammatically in FIG. 2, a possible thin scratch on the substrate had side walls comprising, from the main face of the substrate, a first part of curved surface which continues as a second substantially flat portion to the edge (indicated as the apex S) of the scratch.

The length of these thin scratches generally varies from 2 nm to 3 cm, most often from 3 nm to 2 cm.

In general, the occurrence of thin individual scratches on the main surface of the substrate is not regular in nature, most often they are situated concentrically on the main surface of the substrate.

In general, the refractive index $n_s$ of the material of the substrate is $\geq 1.60$, preferably $\geq 1.65$, more preferably is $\geq 1.70$ The material of the substrate may be all inorganic or organic transparent solid material, particularly all material conventionally used for producing optical articles, such as ophthalmic lenses, and notably eyewear lenses.

Preferably, the material of the substrate is an organic lens, that is a material of which the main components are homo- and copolymers or mixtures of these homo- and copolymers.

Among the substrates made of organic glass suitable for the present invention, mention can be made of substrates made of polycarbonate (PC), substrates obtained by polymerisation and copolymerisation of alkyl(meth)acrylates, particularly $C_1$-$C_4$ alkyl (meth)acrylates and polyethoxlated aromatic (meth)acrylates such as polyethoxylated bisphenolate dimethacrylates, derivatives such as aliphatic or aromatic, linear or branched polyol allylcarbonates, thio(meth)acrylates (that is compounds comprising at least 1, preferably 2—S C(O)CH(R)=CH$_2$ groups where R=H or CH$_3$) and particularly alkyl thio(meth)acrylates, alkyl notably $C_1$-$C_4$ thio(meth)acrylates, polythiourethane polymers and copolymers, polyepisulphide polymers and copolymers, and the alloys of these polymers and copolymers.

Among the substrates obtained by polymerisation of polyol allylcarbonates, mention can be made of those obtained by polymerisation of ethyleneglycol bis-(allylcarbonate), diethyleneglycol bis-(2-methylcarbonate), diethyleneglycol bis-(allylcarbonate), methyleneglycol bis-(2-chloroallylcarbonate), triethyleneglycol bis-(allylcarbonate), 1,3-propanediol bis-(allylcarbonate), propyleneglycol bis-(2-ethylallylcarbonate, 1,3-butyleneldiol bis-(allylcarbonate), 1,4 butynediol bis-(2-bromoallylcarbonate), dipropyleneglycol bis-(allylcarbonate), trimethyleneglycol bis-(2-ethylallylcarbonate), pentaethyleneglycol bis-(allylcarbonate), isopropylene bisphenol-A bis(allylcarbonate).

A preferred polyol allylcarbonate copolymer is the copolymer of diethyleneglycol bis-(allylcarbonate) sold under the brand name CR39® by PPG INDUSTRIE.

The preferred materials for the substrates of the invention are homo- and copolymers of polythiourethanes, homo- and copolymers of polysulphides, homo- and copolymers of polycarbonates, homo- and copolymers of polythio(meth) acrylates and mixtures thereof.

Among these polythio(meth)acrylate based materials, mention can be made of those obtained by polymerisation of thio(meth)acrylic monomers such as those described in the French patent FR-A-2 734 827.

Homo- and copolymers of polythiourethanes suitable as material for the substrates of the present invention, are described, among other places, in the U.S. Pat. No. 4,689,387, U.S. Pat. No. 4,775,733, U.S. Pat. No. 5,191,055, U.S. Pat. No. 5,087,758 and the international application WO 03/040205.

The preferred polythiourethane materials according to the invention are those obtained by polyaddition reaction of a polyisocyanate or a polyisothiocyanate having 2 or more isocyanate or isothiocyanate functions per molecule, preferably 2 or 3 isocyanate or isothiocyanate functions and more preferably 2 isocyanate or isothiocyanate functions per molecule with a polythiol or polyol compound having 2 or more, preferably 3 to 4, thiol or hydroxyl functions per molecule.

These poly(thio)isocyanates and polyol or polythiol compounds can be monomers or prepolymers, as described particularly in the international application WO 03/04 0205.

Among the preferred polyisocyanates or isothiocyanates, mention can be made of those with the formulae:

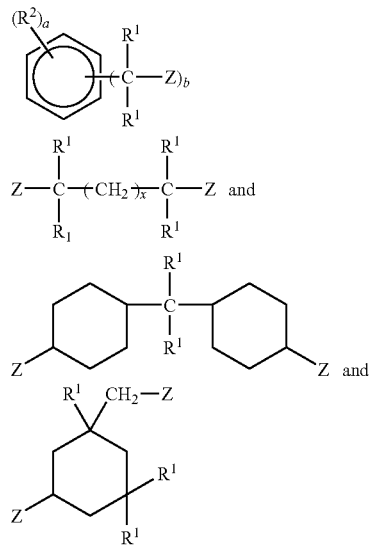

wherein
the $R^1$ groups are, independently from each other, H or a $C_1$-$C_5$ alkyl group preferably $CH_3$ or $C_2H_5$;
$R^2$ is H, a halogen, preferably Cl or Br, or a $C_1$-$C_5$ alkyl group preferably $CH_3$ or $C_2H_5$;
Z is: —N=C=X
where X is O or S preferably O;
a is an integer from 1 to 4, b is an integer from 2 to 4 and a+b≦6;
and x is an integer from 1 to 10, preferably from 1 to 6.

Among the preferred polyiso(thio)cyanate monomers mention can be made of tolylenediiso(thio)cyanate, phenylenediiso(thio)cyanate, methylphenylenediiso(thio)cyanate, isopropylphenylene diiso(thio)cyanate, diethylphenylenediiso(thio)cyanate, diisopropylphenylenediiso(thio) cyanate, trimethylbenzyltriiso(thio)cyanate, xylylenediiso (thio)cyanate, benzyltriiso(thio)cyanate, 4,4'-diphenylmethanediiso(thio)cyanate, naphtalenediiso(thio) cyanate, isophoronediiso(thio)cyanate, bis(iso(thio) cyanatomethyl)cyclohexane, hexamethylene diiso(thio) cyanate and dicyclohexylmethanediiso(thio)cyanate.

The polythiol monomer can be any suitable polythiol having 2 or more, preferably 3 or 4 thiol functions.

These polythiol monomers can be represented by the formula:

$$R'(SH)_{n'}$$

wherein n' is an integer from 2 to 6 and preferably from 3 to 4, and R' is an organic group with a valence equal to n'.

Such polythiol monomers are described, among other places, in the patent EP-1-394495, and the U.S. Pat. No. 4,775,733, U.S. Pat. No. 5,087,758 and U.S. Pat. No. 5,191, 055.

Among the polythiol monomers mention can be made of aliphatic polythiols such as pentaerythritol tetrakis(mercaptopropionate), 1-(1'-mercaptoethylthio)-2,3-dimercaptopropane, 1-(2'-mercaptopropylthio)-2,3-dimercaptopropane, 1-(3'-mercaptopropyl-thio)-2,3-dimercaptopropane, 1-(4'-mercaptobutylthio)-2,3-dimercaptopropane, 1-(5'-mercaptopentylthio)-2,3-dimercaptopropane, 1-(6'-mercaptohexylthio)-2,3-dimercaptopropane, 1,2-bis-(4'-mercaptobutylthio)-3-mercaptopropane, 1,2-bis-(5'-mercaptopentylthio)-3-mercaptopropane, 1,2-bis-(6'-mercaptohexyl)-3-mercatopropane, 1,2,3-tris-(mercaptomethylthio)propane, 1,2,3-tris-(3'-mercapto-propylthio)propane, 1,2,3-tris-(2'-mercaptoethylthio)propane, 1,2,3-tris-(4'-mercaptobutylthio)propane, 1,2,3-tris-(6'-mercaptohexylthio)propane, methanedithiol, 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis-(2'-mercaptoethylthio)-3-mercaptopropane.

Among the polythiols, mention can also be made of polythiols with the formulae:

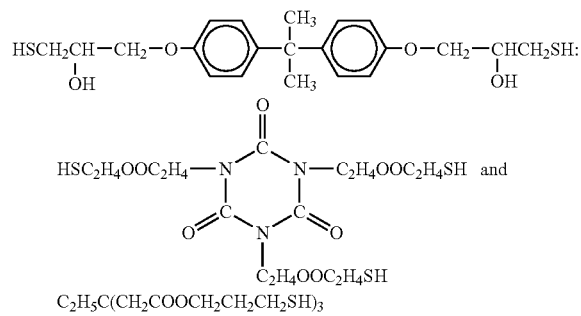

Preferred polythiol monomers are those with the formulae:

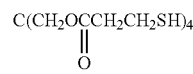

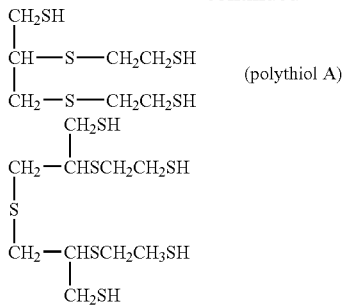

and most preferably polythiol A.

The preferred polyurethanes in the present invention are those obtained from diisocyanate monomers and polythiols, and most preferably from xylylenediisocyanate $C_6H_4(CH_2NCO)_2$ (XDI) and polythiol A.

A polyurethane based substrate material particularly suitable for the present invention is the material marketed under the name MR7 by MITSUI.

Another preferred category of material for the substrate of the transparent optical article according to the invention is comprised of homo- and copolymers of polyepisulphides, particularly diepisulphides.

Such homo- and copolymers are described, among other places, in the patents EP-761 665, EP-785 194 EP-874 016 and the U.S. Pat. No. 6,204,311.

The preferred episulphide compounds for the substrates are episulphide compounds comprising two or more groups with the formula:

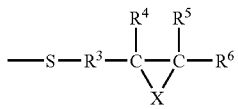

wherein $R^3$ is a divalent hydrocarbon radical having 1 to 10 carbon atoms, $R^4$, $R^5$ and $R^6$ are, independently from each other, H or a monovalent hydrocarbon radical having 1 to 10 carbon atoms, and X is S or O, the proportion of S atoms being 50% or more on average compared to the total number of S and O atoms constituting three-membered rings.

The preferred episulphide groups are those with the formula

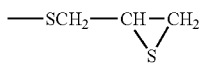

The particularly preferred episulphides have the formula:

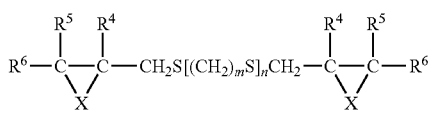

wherein $R^4$, $R^5$ and $R^6$ and X are as defined above, m is an integer from 1 to 6 and n is an integer from 0 to 4, the proportion of S atoms being 50% or more on average compared to the total number of S and O atoms constituting three-membered rings The preferred polyepisulphide based materials are those resulting from the polymerisation or copolymerisation of diepisulphide compounds having at least one intramolecular disulphide bond.

Among the polyepisulphide compounds, mention can be made of the following compounds:

bis-(2,3-epithiopropyl)disulphide, bis-(2,3-epithiopropyldithio)methane, bis-(2,3-epithiopropyldithio)ethane, bis-(6,7-epithio-3,4-dithiaheptane)sulphide 1,4-dithiane-2,5-bis-(2,3-epithiopropyldithiomethyl), 1,3-bis-(2,3-epithiopropyldithiomethyl)benzene, 1,6-bis-(2,3-epithiopropyldithio)-2-(2,3-epithiopropyldithioethylthio)-4-thiahexane, 1,2,3-tris-(2,3-epithiopropyldithio)propane, bis-(β-epithiopropylthio)methane, 1,2-bis(β-epithiopropylthio)ethane, 1,3-bis-(β-epithiopropylthio)propane, 1,2-bis-(β-epithiopropylthio)propane, 1-(β-epithiopropylthio)-2-(β-epithiopropylthiomethyl)propane, 1,4-bis-(β-epithiopropylthio)butane, 1,3-bis-(β-epithiopropylthio)butane, 1-(β-epithiopropylthio)-3-(β-epithiopropylthiomethyl)butane, 1,5-bis-(β-epithiopropylthio)pentane, 1-(β-epithiopropylthio)-4-(β-epithiopropylthiomethyl)pentane, 1,6-bis-(β-epithio propylthio)hexane, 1-(β-epithiopropylthio)-5-(β-epithiopropylthiomethyl)hexane, 1-(β-epithiopropylthio)-2-[(β-epithiopropylthioethyl)thio]ethane and 1-(β-epithiopropylthio)-2-[[2-(2-β-epithiopropylthioethyl)thioethyl]thio]ethane; branched organic compounds such as tetrakis-(β-epithiopropylthiomethyl)methane, 1,1,1-tris-(β-epithioprop ββγylthiomethyl)propane, 1,5-bis-(β-epithiopropylthio)-2-(β-epithiopropylthiomethyl)-3-thiapentane, 1,5-bis-(β-epithiopropylthio)-2,4-bis(β-epithiopropylthiomethyl)-3-thiapentane, 1-(β-epithiopropylthio)-2,2-bis-(β-epithiopropylthiomethyl)-4-thiahexane, 1,5,6-tris-(β-epithiopropylthio)-4-(β-epithiopropylthiomethyl)-3-thiahexane, 1,8-bis-(β-epithiopropylthio)-4-(β-epithiopropylthiomethyl)-3,6-dithiaoctane, 1,8-bis-(β-epithiopropylthio)-4,5-bis-(β-epithiopropylthiomethyl)-3,6-dithiaoctane, 1,8-bis-(β-epithiopropylthio)-4,4-bis-(β-epithiopropylthiomethyl)-3,6-dithiaoctane, 1,8-bis-(β-epithiopropylthio)-2,4,5-tris-(β-epithiopropylthiomethyl)-3,6-dithiaoctane, 1,8-bis-(β-epithiopropylthio)-2,5-bis-(β-epithiopropylthiomethyl)-3,6-dithiaoctane, 1,9-bis-(β-epithiopropylthio)-5-(β-epithiopropylthiomethyl)-5-[(2-β-epithiopropylthioethyl)thiomethyl]-3,7-dithianonane, 1,10-bis-(β-epithiopropylthio)-5,6-bis-[2,β-epithiopropylthioethyl)thio]-3,6,9-trithiadecane, 1,11-bis-(β-epithiopropylthio)-4,8-bis-(β-epithiopropylthiomethyl)-3,6,9-trithiaundecane, 1,11-bis-(β-epithiopropylthio)-5,7-bis-(β-epithiopropylthiomethyl)-3,6,9-trithiaundecane, 1,11-bis-(β-epithiopropylthio)-5,7-[(2-β-epithiopropylthio)thiomethyl]-3,6,9-trithiadecane and 1,11-bis-(β-epithiopropylthio)-4,7-bis-(β-epithiopropylthiomethyl)-3,6,9-trithiaundecane; and compounds obtained by substituting at least one hydrogen atom from the episulphide group in the above compounds by a methyl group, cycloaliphatic compounds such as 1,3- and 1,4-bis-(β-epithiopropylthio)cyclohexanes, 1,3- and 1,4-bis-(β-epithiopropylthiomethyl)cyclohexanes, bis-[4-(β-epithiopropylthio)cyclohexyl]methane, 2,2-bis-4[-(β-epithiopropylthio) cyclohexyl]propane, bis-[4-(β-epithiopropylthio)cyclohexyl]sulphide 2,5-bis-(β-epithiopropylthioethylthiomethyl)-1,4-dithiane and 2,5-bis-(β-epithiopropylthioethylthiomethyl)-1,4-dithiane and compounds obtained by substituting at least one hydrogen atom from the episulphide group in the above compounds by a methyl group, and aromatic organic compounds such as 1,3- and 1,4-bis-(β-epithiopropylthio)benzenes, 1,3- and 1,4-bis-(β-epithiopropylthiomethyl)benzenes, bis-4-(β-epithiopropylthio) phenyl]methane, 2,2-bis-[4-(β-epithiopropylthio) phenyl]propane, bis[4-(β-epithiopropylthio)phenyl] sulphide, bis-[4-(β-epithiopropylthio)phenyl]sulphone and 4,4'-(β-epithiopropylthio)biphenyl.

The preferred diepisulphide is the monomer having the formula:

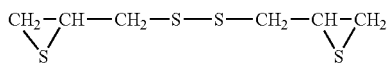

Another particularly preferred diepisulphide is the monomer having the formula:

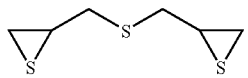

The term "direct deposition of the masking coating composition", as used herein is understood to mean depositing the masking coating composition on a ground and polished main face having not been subjected to any process or having been subjected to a physical or chemical process which does not appreciably affect the thin surfacing scratches, that is which does not appreciably affect the shape of the scratches.

Among the physical processes that can be used, particularly to increase the adhesion of the masking coating to the substrate, mention can be made of conventional processes such as corona discharge processes, plasma processes or ultra violet processes.

Among the chemical processes mention can be made of conventional processes with acids or bases, particularly processes using a sodium hydroxide solution. It is also possible to apply to the main ground and polished face a thin layer of a coupling agent, with a thickness ≦5 nanometers. Preferably, however, the transparent article devoid of visible surfacing scratches according to the invention does not comprise a thin layer of coupling agent.

The preferred coupling agents are precondensed solutions of an epoxyalkoxysilane and an unsaturated alkoxysilane, preferably containing a terminal double ethylene bond. These coupling agents are described in more detail below in the context of their use in compositions for anti-abrasion coatings.

The compositions for masking coating according to the invention can be all liquid, polymerisable, notably photo-polymerisable and heat-polymerisable, compositions having a contact angle with the main face of the substrate equal to or less than 30°, preferably equal to or less than 25° and most preferably equal to or less than 20°, forming by polymerisation a masking coating having a refractive index $n_c$ such that $0.01<|n_s-n_c|\leq0.15$, preferably $0.05\leq|n_s-n_c|\leq0.15$, and removing all visibility of surfacing lines, notably thin individual scratches, for a thickness of masking coating less than 10 μm.

Preferably, the contact angle of the composition of the masking coating with the main face of the substrate varies from 2 to 17°, more preferably from 5 to 15°.

Preferably likewise the masking coating has a thickness of 1.5 to 8 μm, preferably from 2 to 5 μm.

Preferably, the composition of masking coating is devoid of all (meth)acrylate compounds.

The preferred composition of masking coating is epoxy based compound compositions, particularly diepoxy compounds and particularly diglycidyl ethers of alkanediols, such as for example the diglycidyl ether of butanediol, the diglycidyl ethers of bisphenols, optionally halogenated and notably brominated, notably the diglycidyl ethers of bisphenol-A and bisphenol-F and the diglycidyl ether of tetrabromo-bisphenol-A and mixtures thereof.

Among the preferred epoxy compounds, mention can be made of epoxy compounds with the following formulae and mixtures thereof:

| Name | Chemical structure |
|---|---|
| DGEBA Diglycidyl ether of bisphenol-A | H₂C—CH—CH₂—O—⟨benzene⟩—C(CH₃)₂—⟨benzene⟩—O—CH₂—CH—CH₂ (with epoxide O) $C_{21}H_{24}O_4$ M = 340 |
| DGEBF Diglycidyl ether of bisphenol-F | H₂C—CH—CH₂—O—⟨benzene⟩—CH₂—⟨benzene⟩—O—CH₂—CH—CH₂ $C_{19}H_{20}O_4$ M = 312 |
| Diglycidyl ether of butanediol | H₂C—CH—CH₂—O—CH₂—CH₂—CH₂—O—CH₂—CH—CH₂ |
| Diglycidyl ether of tetrabromo bisphenol-A | H₂C—CH—CH₂—O—⟨Br₂-benzene⟩—C(CH₃)₂—⟨Br₂-benzene⟩—O—CH₂—CH—CH₂ $C_{21}H_{20}O_4Br_4$ M = 656 |

The compositions for masking coating of the invention generally contain a dilution solvent or a mixture of dilution solvents to regulate the viscosity of the composition and the wettability of the composition as regards the main face of the substrate.

Solvents suitable for the composition of the masking compositions according to the invention can be selected from any conventional organic solvent such as alcohols, esters, ketones, tetrahydropyrane and mixtures thereof. Mention can be made of:

methanol ($CH_3OH$, Carlo Erba), 1-propanol ($CH_3CH_2CH_2OH$, VWR International), 1-methoxy-2-propanol ($CH_3CH(OH)CH_2OCH_3$, Sigma Aldrich), 2-methyl-2-butanol (($CH_3)_2C(OH)CH_2CH_3$, Sigma Aldrich), butoxyethanol ($CH_3(CH_2)_3OCH_2CH_2OH$, Sigma Aldrich), or any mixture of these solvents.

Preferably 4-hydroxy-4-méthyl-2-pentanone ($CH_3)_2C(OH)CH_2COCH_3$, VWR International) and ether glycol DOWANOL PM (Dow Chemical) will be selected.

The compositions for masking coating, in the diluted state, generally contain from 10% to 90% by mass with respect to the total mass of the diluted composition of one or several epoxy compounds, and preferably from 30 to 60% by weight.

Preferably compositions for masking coating according to the invention also contain one or several initiators, particularly inducing cationic polymerisation, notably a cationic photo-polymerisation, of the compositions. Examples of cationic initiators are aromatics and iron arene salts complexes. Suitable photo-initiators are described, among other places, in the U.S. Pat. Nos. 3,981,897, 4,058,401, 4,101,513, 4,138,255, 4,161,471 and in the international application WO 94/10230.

Among the photosensitive aromatic onium salts suitable for the masking compositions according to the invention, mention can be made of arylsulphonium hexafluorophosphates and hexane antimonates, triphenylselenonium, and bis(4-dodecilphenyl)-iodionium. Cationic initiators are marketed by CIBA GEIGY with the brand names IRGACURE 261 and UVI 6974. Preferred cationic initiators are the compounds and mixtures of the compounds with the structures described below.

Chemical structure

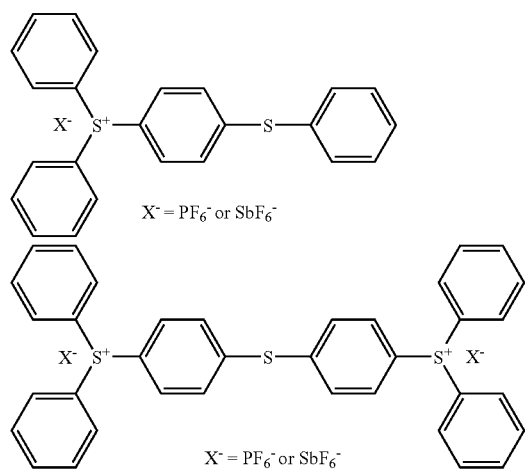

Generally, the quantity of initiator of cationic polymerisation present in the compositions for masking coating according to the invention varies from 0.1 to 5% by weight compared with the total weight of the composition for coating.

Other preferred masking compositions are sol/gel type compositions, such as compositions based on hydrolysates of epoxysilane(s).

Preferred epoxyalkosilanes contain an epoxy group and three alkoxy groups, the latter being directly bonded to the silicon atom.

A preferred epoxyalkosilane can be an alkoxysilane bearing a β-(3,4-epoxycyclohexyle) group, such as β-(3,4-epoxycyclohexyl)ethyltrimethoxysilane.

The particularly preferred epoxyalkosilanes have the formula (I):

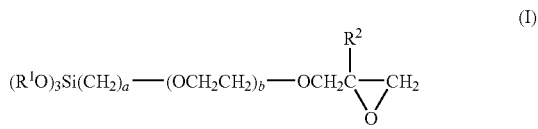

wherein:

$R^1$ is an alkyl group with 1 to 6 carbon atoms, preferably a methyl or ethyl group, $R^2$ is a methyl group or a hydrogen atom, a is an integer from 1 to 6, b is 0, 1 or 2.

Examples of such epoxysilanes are γ-glycidoxypropyl-triethoxysilane or γ-glycidoxypropyltrimethoxysilane.

The compositions for masking coating according to the invention can also contain colloids, particularly colloids with a high refractive index, that is a index $n_D^{25} \geq 1.54$ and more particularly colloids of metallic oxide such as colloids of $SiO_2$, $TiO_2$, $ZrO_2$, $SnO_2$, $Sb_2O_3$, $Y_2O_3$, $Ta_2O_5$ and mixtures thereof.

The preferred colloids are $SiO_2$, $TiO_2$, $ZrO_2$ and their mixtures. The preferred particles are composite particles based on the following oxides $SiO_2/TiO_2$, $SiO_2/ZrO_2$ and $SiO_2/TiO_2/ZrO_2$. Preferably, $TiO_2$ is in the form of rutile.

A more particularly preferred colloid is a mineral colloid selected from colloids of composites of $TiO_2/ZrO_2/SiO_2/SnO_2$ in which $TiO_2$ has a rutile crystallographic structure. Such colloids are available from the Catalysts and Chemical Company.

Particularly recommended composite particles are described in the patents EP730168, JP11310755, JP200204301, JP2002363442.

Preferably, compositions for masking coating do not contain $TiO_2$ in the form of anatase and do not form a γ-glycidoxypropyl trimethoxysilane based varnish containing a mineral colloid chosen from the $TiO_2$ with an anatase crystallographic structure and the composite $TiO_2/ZrO_2/SiO_2$ in which $TiO_2$ has an anatase crystallographic structure.

In general, the size of the colloid particles varies from 10 to 80 nm, preferably from 10 to 30 nm.

In particular, the mineral oxide can be comprised of a mixture of small sized particles, that is 10 to 15 nm and large sized particles, that is 30 to 80 nm.

In the case of a mixture of colloidal mineral oxides, preferably, the mixture comprises at least one low index oxide (<1.54), the weight ratio of low index oxide/high index oxide varying in general from 20/80 to 80/20, preferably 30/70 to 70/30 and more preferably 40/60 to 60/40.

Typically, the compositions for masking coating according to the invention can contain 5% to 50% by mass of colloids.

The composition of masking coating is deposited by spin coating or by dip coating.

Preferably, the method of the invention also comprises the step of forming on the masking coating one or several functional coatings, that is, coatings conferring various advantageous optical and mechanical properties to the article, such as anti-shock, abrasion resistance, eliminating reflection, etc.

Thus, generally, the masking coating can be covered either directly with an abrasion resistant layer, or with a primary layer, that improves the impact resistance of the article, onto which an abrasion resistant layer can be deposited, the primary layer also improving the anchoring of the abrasion resistant layer. It is also possible to deposit onto the abrasion resistant layer an anti-reflection coating and lastly it is also possible to coat the anti-reflection coating with a hydrophobic and oleophobic dirt-repellent coating.

The masking coating, primary or anti-abrasion coating layer can contain different types of additives such as UV absorbers, pigments, and photochromic pigments.

In the case where photochromic properties are required to be conferred on the final ophthalmic lens, the preferred embodiment of the invention is to deposit the masking coating onto the substrate, then a polyurethane primer containing a photochromic pigment onto the masking coating.

The primer layer, when it is present, can be any primary layer conventionally used in optics and particularly in ophthalmics.

Typically, these primers, particularly impact resistant primer coatings, are (meth)acrylic polymer, polyurethane or polyester based coatings, or epoxy/(meth)acrylate copolymer based coatings.

The (meth)acrylic polymer based impact resistant coatings are described, among other places, in the U.S. Pat. No. 5,015, 523 and U.S. Pat. No. 5,619,288, while thermoplastic and reticulated polyurethane resin based coatings are described, among other places, in the Japanese patents 63-141001 and 63-87223, European patent EP-040411 and the U.S. Pat. No. 5,316,791.

In particular, the impact resistant primer coating of the invention can be produced from a poly(meth)acrylic latex, including the core-shell type as described, for example, in the French patent application FR 2.790.317, for a polyurethane latex of a polyester latex.

Among the particularly preferred impact resistant primer coating compositions, mention can be made of the acrylic latex marketed under the name A-639 by Zeneca and polyurethane latexes marketed under the names W-240 and W-234 by Baxenden.

Preferably latexes with a particle size ≧50 nm and more preferably ≧20 nm will be selected.

Particularly preferred latexes are polyurethane latexes.

Generally, after hardening, the impact resistant primary layer has a thickness of from 0.05 to 20 μm, preferably from 0.5 to 10 μm and more preferably from 0.6 to 6 μm. The optimal thickness is generally from 0.5 to 2 μm.

Generally, the primary layer has a refractive index that varies from 1.47 to 1.55 and preferably from 1.51 to 1.53.

Forming the (latex) primary impact resistant coating comprises depositing a latex on the masking coating and hardening the latex, at least partially.

The anti-abrasion coating can be any anti-abrasion coating conventionally used in optics and particularly in ophthalmic optics.

By definition, an anti-abrasion coating is a coating which improves the abrasion resistance of a finished optical article compared with the same article that does not comprise the anti-abrasion coating.

Preferred anti-abrasion coatings are those obtained by hardening of a composition including one or several epoxyalkoxysilanes or a hydrolysate thereof, silicon dioxide and a hardening catalyst. Examples of such compositions are described in the international application WO 94/10230 and U.S. Pat. Nos. 4,211,823 and 5,015,523, and European patent EP 614957.

Particularly preferred anti-abrasion coating compositions are those comprising as main constituents an epoxyalkoxysilane such as, for example, γ-glycidoxypropyltrimethoxysilane (GLYMO), a dialkyldialkoxysilane such as, for example, dimethyldiethoxysilane (DMDES), collidal silica and a catalytic quantity of a hardening catalyst such as aluminium acetylacetonate or a hydrolysate of these components, the rest of the composition consists essentially of solvents conventionally used for formulating these compositions and optionally one or several tensioactive agents.

In order to improve the adherence of the anti-abrasion coating, the composition of the anti-abrasion coating can optionally contain an effective quantity of a coupling agent.

This coupling agent is typically a precondensed solution of an epoxyalkoxysilane and an unsaturated alkoxysilane, preferably containing a terminal double ethylene bond.

Examples of epoxyalkoxysilanes are:
γ-glycidoxypropyltrimethoxysilane,
γ-glycidoxypropylpentamethyldisiloxane,
γ-glycidoxypropylmethyldiisopropenoxysilane,
γ-glycidoxypropyl)methyldiethoxysilane,
γ-glycidoxypropyldimethoxyethoxysilane,
γ-glycidoxypropyldiisopropylethoxysilane and
γ-glycidoxypropyl)bis(trimethylsiloxy)methylsilane.

The preferred epoxyalkoxysilane is
(γ-glycidoxypropyl)trimethoxysilane.

The unsaturated alkoxysilane can be a vinylsilane, an allylsilane, an acrylic or methacrylic silane.

Examples of vinylsilanes are:
vinyltris(2-methoxyethoxy)silane,
vinyltris isobutoxysilane,
vinyltri-t-butoxysilane,
vinyltriphenoxysilane,
vinyltrimethoxysilane,
vinyltriisopropoxysilane,
vinyltriethoxysilane,
vinyltriacetoxysilane,
vinylmethyldiethoxysilane,
vinylmethyldiacetoxysilane,
vinyl bis(trimethylsiloxy)silane and vinyldimethoxysilane.

Examples of allylsilanes are allyltrimethoxysilane, allyltriethoxysilane and allyltris(trimethylsiloxy)silane.

Examples of acrylic silanes are:
3-acryloxypropyltris(trimethylsiloxy)silane,
3-acryloxypropyltrimethoxysilane,
acryloxypropylmethyl-dimethoxysilane,
3-acryloxypropylmethylbis(trimethylsiloxy)silane,
3-acryloxypropyldimethylmethoxysilane,
n-(3-acryloxy-2-hydroxypropyl)-3-aminopropyltriethoxysilane.

Examples of methacrylic silanes are:
3-methacryloxypropyltris(vinyldimethoxylsiloxy)silane,
3-methacryloxypropyltris(trimethylsiloxy)silane,
3-methacryloxypropyltris(methoxyethoxy)silane,
3-methacryloxypropyltrimethoxysilane,
3-methacryloxypropylpentamethyl disiloxane,
3-methacryloxypropylmethyldimethoxysilane,
3-methacryloxypropylmethyldiethoxysilane,
3-methacryloxypropyldimethyl methoxysilane,
3-methacryloxypropyldimethylethoxysilane,
3-methacryloxypropenyltrimethoxysilane,
and 3-methacryloxypropylbis(trimethylsiloxy)methylsilane.

The preferred silane is acryloxypropyltrimethoxysilane.

Typically, the quantity of coupling agent introduced in the composition of anti-abrasion coating is 0.1 to 15% by weight of the total weight of the composition, preferably 1 to 10% by weight.

The thickness of the anti-abrasion coating, after hardening, is usually from 1 to 15 µm, preferably from 2 to 6 µm.

The compositions of impact resistant primer coating and anti-abrasion coating can be hardened by heat and/or by irradiation, preferably by heat.

The impact resistant primer coating and anti-abrasion coating layers can be formed by any conventional method such a by dip coating or by spin coating, preferably by spin coating. Thereby, the compositions for forming these layers are preferably sol-gel compositions.

The method of the invention can optionally comprise the deposition of an anti-reflection coating on the anti-abrasion coating layer.

The anti-reflection coating can be any anti-reflection coating conventionally used in optics, particularly in ophthalmic optics.

By way of example, the anti-reflection coating can be comprised of a mono- or multilayer film, of dielectric material such as $SiO$, $SiO_2$, $Si_3N_4$, $TiO_2$, $ZrO_2$, $Al_2O_3$, $MgF_2$ or $Ta_2O_5$, or mixtures thereof.

In this way it becomes possible to prevent the appearance of a reflection at the lens-air interface.

This anti-reflection coating is generally applied by depositing it in a vacuum according to one of the following techniques:

By evaporation, optionally assisted by an ion beam.
By atomizing by an ion beam.
By cathode sputtering.
By plasma assisted vapour phase chemical deposition.

As well as vacuum deposition, it is also possible to envisage a deposit of a mineral layer by the sol-gel route (for example based on a hydrolysate of tetraethoxysilane).

In the case in which the film consists of a single layer, its optical thickness must be equal to $\lambda/4$ ($\lambda$ is a wavelength comprised between 450 and 650 nm).

For a multilayer film comprising three layers, a combination corresponding to the respective optical thicknesses $\lambda/4$, $\lambda/2$, $\lambda/4$ or $\lambda/4$, $\lambda/4$, $\lambda/4$ can be used.

In a recommended embodiment of the invention, the method comprises the formation between the masking coating and the impact resistant primer coating, of one or several layers of anti-interference fringe coating, preferably each constituting a quarter wave plate in the area ranging from 400 to 700 nanometers, preferably 450 to 650 nanometers.

The optical and geometrical characteristics of such a quarter wave plate are given by the following equations:

$$n=(n_c \times n_p)^{1/2}, \text{ and}$$

$$n \cdot e = \lambda/4$$

where n is the refractive index at 25° C. for the wavelength $\lambda$=550 nanometers of the quarter wave plate (the wavelength corresponding to the maximum sensitivity of the eye).

$n_c$ is the refractive index at 25° C. for the wavelength $\lambda$=550 nanometers of the masking coating, and $n_p$ is the refractive index at 25° C. for the wavelength $\lambda$=550 nanometers of the impact resistant primer coating directly in contact with the quarter wave plate.

In other words, the index n of the quarter wave plate is the geometrical mean of the indexes of the surrounding materials.

The layer or layers of anti-fringe coating forming the ¼ wavelength coating preferably comprise at least one colloidal mineral oxide generally selected from $SiO_2$, $TiO_2$, $ZrO_2$, $SnO_2$, $Sb_2O_3$, $Y_2O_3$, $Ta_2O_5$ and mixtures thereof. The preferred colloidal mineral oxides are $SiO_2$, $TiO_2$, $ZrO_2$ and their mixtures $SiO_2/TiO_2$ and $SiO_2/ZrO_2$.

The preferred colloidal silicas are the silicas prepared by the Stöber method. The Stöber method is a simple, well known method which consists in a hydrolysis and condensation of ethyl tetra silicate (Si $(OC_2H_5)_4$ or TEOS) in ethanol catalysed by ammoniac. The method makes it possible to obtain a silica directly in the ethanol, a population of practically monodispersed particles, an adjustable particle size and a ($SiO^-NH_4^+$) particle surface.

In the case of a mixture of colloidal mineral oxides, preferably the mixture comprises at least one high index oxide, that is, having a refractive index $n_D^{25} \geq 1.54$ and at least one low index oxide, that is, having a low refractive index $n_D^{25} < 1.54$ Preferably, the mineral oxide mixtures are binary mixtures, particularly of a low index oxide and a high index oxide. Generally, the relationship by weight of low index oxide/high index oxide varies from 20/80 to 80/20, preferably 30/70 to 70/30 and more preferably 40/60 to 60/40.

The size of the particles of mineral oxide varies generally from 10 to 80 nm, preferably 30 to 80 nm and more preferably from 30 to 60 nm.

In particular, the mineral oxide can be constituted of a mixture of small sized particles, that is from 10 to 15 nm and large sized particles, that is from 30 to 80 nm.

Typically, the layer or each of the layers of colloidal mineral oxide has a thickness of from 60 to 100 nm, preferably from 70 to 90 nm, and more preferably from 80 to 90 nm, it being understood that this thickness must be as close as possible to the theoretical thickness of a quarter wave plate, taking account of the materials used for the optical article, for an optimal result of attenuating the interference fringes.

The layers of colloidal mineral oxide preferably generally contain a polymer material which does not harm the optical properties of the final quarter wave plate and which increases the cohesion of the mineral oxide particles at the surface of the masking coating.

The binding agents are generally materials similar to the compositions of impact resistant primer coating described above.

The preferred binding agents are polyurethane latexes and (meth)acrylic latexes, most particularly polyurethane latexes.

The binding agent or binding agents can be added totally or partly to the composition of colloidal mineral oxide in order to form the anti-fringe coating or they can derive from the filling of the porosity of one or several mineral oxide layers by the material of the impact resistant primer coating deposited immediately afterwards.

Thus it is possible to form on the masking coating one or several layers of colloidal mineral oxide having a porosity of at least 40% by volume and preferably of the order of 50% by volume compared to the total volume of the layer, in the absence of binding agent, and before filling in by the polymer material of the primer coating layer or one or several layers of colloidal mineral oxide containing at least one binding agent (for example 1 to 30%, preferably 10 to 25% and more preferably 10 to 20% by weight compared with the dry weight of mineral oxides in the layer) preferably with a porosity of at least 25%, more preferably of at least 30% by volume before filling for the polymer material of the composition of impact resistant primer coating.

The depositing of a layer of colloidal mineral oxide on the masking coating can be done by dip coating in a colloidal mineral oxide sol or spin coating of the sol, preferably by dip coating.

In the case of depositing by dip coating, the thickness deposited is a function of the proportion of dry matter in the sol, the size of the particles and speed of dewetting (Landau-Levich Law). Thus, knowing the composition of the sol, the size of the particles, the refractive index of the masking coating and of the primer coating, it is possible to determine the required thickness of the colloidal mineral oxide layer and the speed of dewetting suitable for obtaining the required thickness.

After drying the deposited layer, a porous colloidal mineral oxide layer of the required thickness is obtained. The porosity of the layer is an essential criterion and must be at least 40% by volume, preferably at least 50% by volume in the absence of binding agent and at least 25%, preferably at least 30% by volume, in the presence of binding agent. The porosity of the layers can be calculated from the refractive indices of the layers measured by ellipsometry.

In the Case of a Layer not Containing Binding Agent

The porosity of the porous colloidal mineral oxide layer is $$p = \frac{Vp}{Vox + Vp}$$

where Vp is the volume of the pores in the layer,
and Vox is the volume occupied by the mineral in the layer.

The porosity p of the layer is equal here to the porosity in the absence of binding agent.

The degree of porosity is calculated from the refractive indices:

$n_m$ (measured by ellipsometry) which is the refractive index of the porous mineral layer, $n_{ox}$ which is the mean refractive index of the mineral oxide particles (optionally mixed if several oxides are used).

and the equation:

$$n_m^2 = p + n_{ox}^2 (1-p) \quad (1\text{-}p)$$

where p is the fraction by volume of pores, supposing that the pores are filled with air and 1-p is the fraction by volume of the mineral oxide.

The refractive indices are determined at 25° C. and a wavelength of 632 nm.

In the Case of a Layer Containing a Binding Agent

The porosity p of the layer is calculated from the following equations:

$$n_m^2 = p + x_{ox}^2 n_{ox}^2 + x_l n_l^2 \quad (1)$$

where $n_{ox}$ is the refractive index of the porous mineral oxide layer, p, $$\text{layer} = \frac{Vp}{V\text{ total}},$$

$x_{ox}$ represents the fraction by volume of the mineral in the layer $$x_{ox} = \frac{Vox}{V\text{ total}},$$

$x_l$ represents the fraction by volume of binding agent in the layer $$x_l = \frac{v_l}{V\text{ total}}$$

Vp, Vox, Vtotal represent respectively the volumes occupied by the pores (air), the mineral oxide, the binding agent and by the whole layer, $n_{ox}$ is the refractive index of the mineral oxide particles,
$n_l$ is the refractive index of the binding agent, $$p + x_l + x_{ox} = 1 \quad (2)$$

$$\frac{x_l}{x_{OX}} = \frac{m_l}{m_{OX}} \times \left(\frac{d_{ox}}{d_l}\right) \quad (3)$$

$d_{ox}$=density of the mineral oxide,
$d_l$=density of the binding agent,
$m_l$=dry mass of the binding agent in the layer,
$m_{ox}$=dry mass of mineral oxide in the layer.

The porosity in the absence of binding agent is by definition $p'=p+x_l$, that is the porosity that the layer would have if the volume of binding agent was occupied by air.

The values of p and p' are obtained by measuring n, by ellipsometry, the indices $n_{ox}$ and $n_l$ are known and the ratio $$\frac{m_l}{m_{ox}}$$

is fixed experimentally.

The different refractive indices are determined at 25° C. at a wavelength of 632 nm.

The following examples illustrate the present invention.

In the examples, unless otherwise specified, all the percentages are weight percentages, and the refractive indices have been measured at 25° C. and with a wavelength λ=550 nanometers.

Semi-finished spherical ophthalmic lenses, with base 6.75 (base=530/R in mm where R is the curvature radius of the lens) made of MR7 material (polythiourethane based) marketed by MITSUI with a refractive index $n_D^{25}$ of 1.660, with a power of −6.00 diopters, are subjected to surfacing treatment as indicated hereinafter.

The surfacing whether on the concave or the convex face is carried out as follows:

Machining on SCHNEIDER HSC100 Machine. The finishing is done with a single crystal diamond tool with a radius of 2 mm, a rotation less than or equal to 600 rpm, a forward motion lower than or equal to 0.04 mm/rev, and a depth of cut equal to 0.1 mm.

Polishing on SCHNEIDER CCP101 Machine. The polishing pad is in flocked fabric. The abrasive is alumina of the POLILENS+ type. For the finishing, the tool turns at 900 rpm with an air pressure inside the piston showing at 1 bar.

The final power of the ophthalmic lens after surfacing is +6.00 diopters, addition 3.50 diopters.

Then different coatings are deposited on the ground and polished lens, as indicated in Table 1 below.

Deposition of the Composition of Masking Coating

The composition of masking coating is deposited by spin coating on the convex face, when the convex face has been surfaced or the concave face when the concave face has been surfaced.

The spin coating rate is 2300 rpm for depositing the masking composition M1, the thickness obtained is 2.3 microns.

The spin coating rate is 2500 rpm for depositing the masking composition M2, the thickness obtained is 2 microns.

The masking coatings are hardened by a LH6-fusion lamp (bulb D, V or H)

The masking composition M1 is a composition consisted of 58% molar of DGEBF (diglycidylether of bisphenol-F) and 42% molar of DEGBA (diglycidyl ether of bisphenol-A), diluted to 50% in 4-hydroxy-4-methyl-2-pentanone $(CH_3)_2C(OH)CH_2COCH_3$, VWR International.

The masking composition M2 is a composition consisted of DEGBA (diglycidyl ether of bisphenol-A) diluted to 50% by weight in 4-hydroxy-4-methyl-2-pentanone $(CH_3)_2C(OH)CH_2COCH_3$ (HMP), VWR International.

Composition and characteristics of Compositions M1 and M2

| | Reagents | | | | Properties | | |
|---|---|---|---|---|---|---|---|
| | HMP solvent | DGEBF % molar | DGEBA % molar | Cationic initiator** | $n_e$ | $n_d$ | $T_g$ |
| M1 | 50% by weight DGEBF + DGEBA | 58 | 42 | yes | 1.614 | 1.610 | 80° and 115° C. |
| M2 | 50% by weight DGEBA | — | >95 | yes | 1.588 | 1.584 | 105° C. |

DGEBF = Diglycidylether of bisphenol-F
DGEBA = Diglycidylether de bisphenol-A
**Cationic initiator: mixture of:

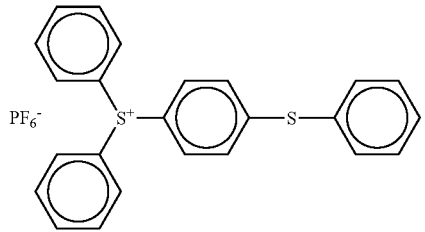

or

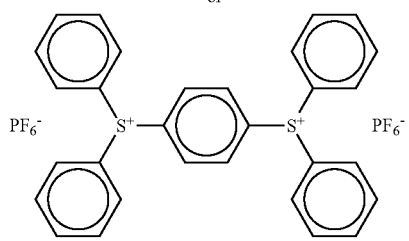

Depositing the Anti-Fringe Layer

The anti-fringe layer is prepared with a final index of 580 and a thickness of 87 nm.

Such a layer can be prepared by following the operating parameters of examples 8 to 13 of the patent application EP1362246.

Depositing the Composition of Impact Resistant Primer Coating P1

Once the masking coating and optionally the anti-fringe layer are deposited, the article is immersed for 4 minutes in a composition of primer coating P comprising a polyurethane latex W234 by BAXENDEN at 5° C.

After removal, the primer coating is dried at 80° C. for 20 minutes and left to cool for 15 minutes.

Depositing the Composition of Anti-Abrasion HC1

The lens coated with the primer coating originating from the composition P is immersed for 4 minutes in a composition for anti-abrasion coating HC1 at 5° C.

Then the composition HC1 is baked.

In this way an article with a primer coating layer and a hard anti-abrasion coating layer on both surfaces is obtained.

The composition for anti-abrasion coating HC1 was prepared as follows:

80.5 parts of HCl 0.1 N are introduced drop wise into a solution containing 224 parts of GLYMO γ-glycidoxypropyltrimethyloxysilane and 120 parts of DMDES dimethyl diethoxysilane.

The solution is agitated for 24 hours at ambient temperature, then 718 parts of 30% colloidal silica in methanol, 15 parts of aluminium acetylacetonate and 44 parts of ethylcellosolve are added. A small quantity of tensioactive agent is added.

Theoretically the dry extract of the composition HC1 contains about 13% of solid matter from the hydrolysed DMDES.

The refractive index of the hardened coating of the composition HC1 is 1.49.

Deposition of the Anti-Abrasion Coating HC2

The anti-abrasion coating HC2 is a high refractive index coating (1.60) obtained by hardening a composition of coating based on hydrolysate of γ-glycidoxypropyl trimethoxysilane and mixed colloide of $TiO_2/ZrO_2/SiO_2$.

The presence of optical defects on the ophthalmic lenses obtained is then evaluated by the protocol described hereinafter.

TABLE 1

| Example | Method of surfacing | Masking coating | Index of masking coating | Thickness of masking coating (μm) | Quarter wave plate | Impact resistant primer coating and thickness | Anti-abrasion coating | Number of lenses tested | % of lenses with optical defects |
|---|---|---|---|---|---|---|---|---|---|
| Comparison 1 | Surfacing convex face* | None | — | — | No | P 1 micron | HC1 3 microns | 30 | 100% |
| Comparison 2 | Surfacing convex face* | None | — | — | No | Non | HC2 2.2 microns | 110 | 60-90% |
| 1 | Surfacing convex face* | M1 | 1.61 | 2.3 | No | P 1 micron | HC1 3 microns | 80 | <10% |
| 2 | Surfacing convex face* | M1 | 1.61 | 2.3 | Yes | P 1 micron | HC1 3 microns | 80 | <10% |
| 3 | Surfacing concave face* | M2 | 1.59 | 2 | Yes | P 1 micron | HC1 3 microns | 24 | 0% |

TABLE 1-continued

| Example | Method of surfacing | Masking coating | Index of masking coating | Thickness of masking coating (μm) | Quarter wave plate | Impact resistant primer coating and thickness | Anti-abrasion coating | Number of lenses tested | % of lenses with optical defects |
|---|---|---|---|---|---|---|---|---|---|
| 4 | Surfacing concave face* | M1 | 1.61 | 2.3 | Yes | P 1 micron | HC1 3 microns | 24 | 0% |

Progressive lenses +6.00 addition 3.50 flocked pad supplied by Delamare
Polishing liquid of the polispeed type Ferro brand
The contact angle of the primer coating P with the substrate MR 7 is 42.7°

EXAMPLES 5 AND 6

Depositing Coating Compositions with Variable Contact Angles

Two compositions of masking coating are prepared with two different concentrations of HMP solvent 4-hydroxy-4-methyl-2-pentanone $(CH_3)_2C(OH)CH_2COCH_3$ from the composition M2: a solution M3 (by diluting M2 at 70% by weight in HMP) and a solution M4 (diluting at 30% by weight in HMP). This makes it possible to vary the contact angle of the composition on a substrate with an index of 1.67.

First, the contact angles of the varnishes M3 and M4 on moulded biplane 1.67 ophthalmic lenses were measured. The protocol is as follows:

The device used is a DIGIDROP made by GBX Instrumentation Scientifique. This is a device that automatically measures the contact angle and the nature of the wettability. The DIGIDROP consists of a camera, an image analysis and processing system and a measurement program.

A drop micro-controller makes it possible to deposit an exact volume of liquid simply using a video control monitor. The substrate is brought into contact with the liquid manually or automatically; the influence of external forces other than the forces due to the surface tension are eliminated. The wettability phenomenon can thus be clearly identified. The DIGIDROP optics system consisting of a camera and a macro camera lens provides an enlarged and accurate image of the drop, without aberration. The software can then analyse the digitalised image of the drop and determine its geometrical features. The contact angle θ, corresponding to the angle between the surface of the solid and the tangent to the surface of the liquid can thus be determined.

After that, the masking coatings M3 and M4 are deposited by spin coating on the convex face of the progressive ophthalmic lenses made of substrate MR7 with a refractive index $n_D^{25}$ of 1.660, geometry +6.00 addition 3.50 obtained by the surfacing method described above for examples 1 to 4. In order for the viscosity of the masking coatings M3 and M4 not to influence the results of covering power, a time lapse is applied between the step of depositing by spin coating and UV polymerisation. The thickness of the coatings after polymerisation of the compositions is 4 microns.

After depositing the primer coating P and the anti-abrasive varnish HC1, the surface defects of the lenses (lines, superficial scratches) are then observed in transmission following the protocol described herein after.

TABLE II

| Example | Masking coating | Contact angle of the composition on a biplane 1.67 ophthalmic lens | Thickness of the masking coating | Primer coating (thickness) | Anti-abrasion coating (thickness) | Number of lens | Covering power number of lenses with optical defects | % of lenses with optical defects |
|---|---|---|---|---|---|---|---|---|
| 5 | M3: M2 (70%) + HMP (30%) | 20° | 4 μm | P (1 micron) | HC1 (3 microns) | 39 | 14 | 36% |
| 6 | M4: M2 (30%) + HMP (70%) | 9° | 4 μm | P (1 micron) | HC1 (3 microns) | 34 | 5 | 15% |

Protocol for Measuring Optical Defects.

The measuring device, which is a measuring device in transmission, and the schematic diagram of the measurement, are shown in FIG. 3.

The measuring device comprises a receptacle (3) with opaque walls (4), containing a light source (5), with an elongated shape, and an aperture (6), in the form of a slit, situated parallel to the light source (5).

The light source (5) is placed, off centre compared with the light source (6), such that almost the whole of the light source (5) is hidden from an observer (7) looking from a view point opposite the aperture (6).

The lens (8) for which the surface defects are being inspected is placed in the observation zone (9), opposite the aperture (6), at a distance of approximately 200 mm from the light source (5), and such that the optical axis (not shown) of this lens (8) is parallel to the direction (10) of viewing of the observer (7).

The observer taking the measurement has 10/10 vision in each eye and the eyes of the observer are placed such that they are situated at approximately 500 mm from the lens to be observed.

The observer (7) and the lens (8) are correctly placed when the observer (7) sees in each field of vision the setup shown in FIG. 4.

The lens (8) is placed in front of the aperture (6) and positioned as indicated previously.

The inspection zone (10) is the zone bordered, in its upper part, by the edge (11) of the light source (5) seen through the lens (8), in its lower part, by the lower edge (12) of the opening (6), seen through the lens (8) and the edge (13) of the lens (8).

The inspection zone (10) as shown in FIG. 4 shows approximately one third of the surface of the lens (8).

The lens (8) is then relocated so that the whole of the optical surface can be seen in the inspection zone.

The ambient light in the room in which the measurement is made must vary from 60 to 130 lux.

The light in the observation zone (9) must be comprised between 600 and 1200 lux.

A lens (or more generally the article in transparent material of the invention) is said to be devoid of visible optical surface defects or devoid of visible surfacing lines if no defect is seen by an observer as previously defined and in the measurement conditions as defined above in the protocol, during an inspection of the lens carried out for a time comprised between 4 and 8 seconds.

The invention claimed is:

1. A method for obtaining a transparent article devoid of visible surfacing lines, comprising:
    obtaining a substrate made of a transparent material with a refractive index $n_s$, of which at least one main surface has been ground and polished to a value of Ra varying from 0.001 to 0.01 μm but which shows visible surface defects in the form of thin individual scratches;
    depositing directly on the main ground and polished face of the substrate a liquid polymerizable composition of masking coating presenting a contact angle with the main face of the substrate equal to or less than 30°, and forming by polymerization a masking coating with a refractive index $n_c$ such that $0.01 < |n_s - n_c| \leq 0.15$, and a thickness of less than 10 micrometers;
    the polymerization of the composition of masking coating; and
    the recovery of the transparent article of which the main ground and polished face of the substrate is directly covered by the masking coating, and which is devoid of visible fine surfacing scratches.

2. The method of claim 1, wherein $0.05 < |n_s - n_c| \leq 0.15$.

3. The method of claim 1, wherein the thin individual scratches have a wedge-shaped cross section.

4. The method of claim 1, wherein the main ground and polished face of the substrate has not undergone the step of fining before the polishing step.

5. The method of claim 1, wherein the occurrence of thin individual scratches shows no regular character.

6. The method of claim 1, wherein the occurrence of thin individual scratches are situated concentrically over the main face of the substrate.

7. The method of claim 1, wherein the contact angle of the composition of masking coating with the main face of the substrate is 25° or less.

8. The method of claim 7, wherein the contact angle of the composition of masking coating with the main face of the substrate is 20° or less.

9. The method of claim 1, wherein the contact angle of the composition of masking coating with the main face of the substrate varies from 2° to 17°.

10. The method of claim 9, wherein the contact angle of the composition of masking coating with the main face of the substrate varies from 5° to 15°.

11. The method of claim 1, wherein the masking coating has a thickness of 1.5 to 8 micrometers.

12. The method of claim 11, wherein the masking coating has a thickness of 2 to 5 micrometers.

13. The method of claim 1, wherein the composition of masking coating contains at least one epoxy compound.

14. The method of claim 13, wherein the epoxy compound comprises at least two epoxy groups per molecule.

15. The method of claim 14, wherein the epoxy compound is a diglycidyl ether of a bisphenol, a diglycidyl ether of an alkanol or a mixture thereof.

16. The method of claim 15, wherein the epoxy compound is a diglycidyl ether of bisphenol-A or F, a brominated diglycidyl ether of bisphenol A and F, a diglycidyl ether of butanediol or a mixture thereof.

17. The method of claim 1, wherein the composition of masking coating is devoid of any (meth)acrylate compound.

18. The method of claim 1, wherein the composition of masking coating is a photo-polymerizable composition.

19. The method of claim 1, further comprising at least one cationic primer.

20. The method of claim 1, wherein the composition of masking coating is deposited by spin coating or by dip coating.

21. The method of claim 1, further comprising forming an impact resistant primer coat on the masking coating.

22. The method of claim 21, wherein forming the impact resistant primer coat comprises depositing a latex on the masking coating and at least the partial hardening of the latex.

23. The method of claim 22, wherein the latex is a (meth) acrylic latex or polyurethane latex.

24. The method of claim 23, wherein the latex is a polyurethane latex.

25. The method of claim 21, further comprising forming an anti-interference fringe coat between the masking coating and the impact resistant primer coat.

26. The method of claim 25, wherein the anti-interference fringe coating constitutes a quarter-wave plate.

27. The method of claim 21, further comprising forming an anti-abrasion coat on the impact resistant primer coat.

28. The method of claim 1, wherein the refractive index $n_s$ of the substrate material is equal to or greater than 1.60.

29. The method of claim 28, wherein the refractive index $n_s$ of the substrate material is equal to or greater than 1.65.

30. The method of claim 29, wherein the refractive index $n_s$ of the substrate material is equal to or greater than 1.70.

31. The method of claim 28, wherein the substrate material is a homo- or copolymer of polythiourethane, homo- or copolymer of polyepisulphide, homo- or copolymer of polycarbonate, homo- or copolymer of polythio(meth)acrylate, or a combination thereof.

32. The method of claim 31, wherein the substrate material is a homo- or copolymer of polythiourethane.

33. The method of claim 31, wherein the substrate material is a polythiourethane-based material resulting from the polyaddition of at least one diisocyanate and at least one polythiol.

34. The method of claim 33, wherein the diisocyanate is xylylene diisocyanate $(C_6H_4(CH_2NCO)_2)$.

35. The method of claim 33, wherein the polythiol(s) is (are) tri and tetra thiols.

36. The method of claim 35, wherein the polythiol has the following formula:

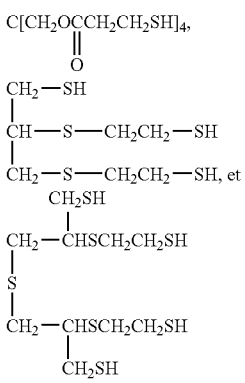

37. The method of claim 33, wherein the substrate material results from the polyaddition of xylylene diisocyanate and polythiol with the formula

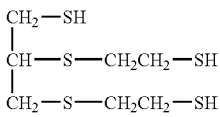

38. The method of claim 31, wherein the substrate material is a homo- or copolymer of polyepisulphide resulting from the polymerization or copolymerization of a diepisulphide with the formula:

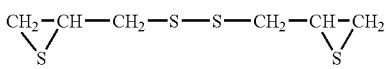

or the formula

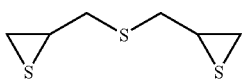

39. The method of claim 1, further defined as a method of producing an optical lens.

40. The method of claim 39, further defined as a method of producing an ophthalmic lens.

41. An article produced by the method of claim 1.

42. An article comprising a substrate in a transparent material with a refractive index $n_s$, at least the main face of which has been ground and polished to a value of $R_a$ varying from 0.001 to 0.01 µm and which has visible surface defects in the form of thin individual scratches, and a transparent polymerized masking coating, with a refractive index $n_c$, with a thickness of under 10 µm directly covering said main face of the substrate, the refractive indices $n_s$ and $n_c$ satisfying the relationship $0.01 < |n_s - n_c| \leq 0.15$, wherein the article is devoid of visible surfacing lines, and wherein the transparent polymerized masking coating has been obtained from a liquid polymerizable composition of masking coating having a contact angle with said substrate main face being equal to or less than 30°.

43. The article of claim 42, wherein the refractive indices $n_s$ and $n_c$ satisfy the relationship $0.05 \leq |n_s - n_c| \leq 0.15$.

44. The article of claim 42, wherein the thin individual scratches have a wedge-shaped cross section.

45. The article of claim 42, wherein the masking coating does not contain γ-glycidoxy propyltrimethoxysilane based varnish containing a mineral colloid chosen from among $TiO_2$ with an anatase crystallographic structure and the mixtures $TiO_2/ZrO_2/SiO_2$ in which $TiO_2$ has an anatase crystallographic structure.

46. The article of claim 42, wherein the occurrence of thin individual scratches shows no regular character.

47. The article of claim 42, wherein the occurrence of thin individual scratches are situated concentrically over the main face of the substrate.

48. The article of claim 42, wherein the masking coating has a thickness of 1.5 to 8 micrometers.

49. The article of claim 48, wherein the masking coating has a thickness of 2 to 5 micrometers.

50. The article of claim 42, wherein the composition of masking coating contains at least one epoxy compound.

51. The article of claim 50, wherein the epoxy compound comprises at least two epoxy groups per molecule.

52. The article of claim 51, wherein the epoxy compound is a diglycidyl ether of bisphenols or a diglycidyl ether of an alkanol.

53. The article of claim 52, wherein the epoxy is a diglycidyl ether of bisphenol-A or F, a brominated diglycidyl ether of bisphenol A or F, or a diglycidyl ether of butanediol.

54. The article of claim 42, wherein the composition of the masking coating is devoid of any (meth)acrylate compound.

55. The article of claim 42, further defined as comprising an impact resistant primer coat on the masking coating.

56. The article of claim 55, wherein the impact resistant coat comprises a hardened latex (meth)acrylic latex or polyurethane latex.

57. The article of claim 55, wherein the impact resistant coat comprises a hardened polyurethane latex.

58. The article claim 55, further defined as comprising an anti-interference fringe coat between the masking coating and the impact resistant primer coat.

59. The article of claim 58, wherein the anti-interference fringe coating constitutes a quarter-wave plate.

60. The article of claim 55, further defined as comprising an anti-abrasion coating on the impact resistant primer coat.

61. The article of claim 42, wherein the refractive index $n_s$ of the substrate material is equal to or greater than 1.60.

62. The article of claim 61, wherein the refractive index $n_s$ of the substrate material is equal to or greater than 1.65.

63. The article of claim 62, wherein the refractive index $n_s$ of the substrate material is equal to or greater than 1.70.

64. The article of claim 42, wherein the substrate material is a homo- or copolymer of polythiourethane, homo- or copolymer of polyepisulphide, homo- or copolymer of polycarbonate, homo- or copolymer of polythio(meth)acrylate, or a combination thereof.

65. The article of claim 64, wherein the substrate material is a homo- and copolymer of polythiourethane.

66. The article of claim 42, further defined as an optical lens.

67. The article of claim 66, further defined as an ophthalmic lens.

* * * * *

UNITED STATES PATENT AND TRADEMARK OFFICE
CERTIFICATE OF CORRECTION

| | | |
|---|---|---|
| PATENT NO. | : 8,153,193 B2 | Page 1 of 1 |
| APPLICATION NO. | : 11/993796 | |
| DATED | : April 10, 2012 | |
| INVENTOR(S) | : Claudine Biver | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this
Tenth Day of July, 2012

David J. Kappos
*Director of the United States Patent and Trademark Office*